(No Model.)
G. H. REYNOLDS.
VALVE FOR HYDRAULIC ELEVATORS.
No. 323,367. Patented July 28, 1885.
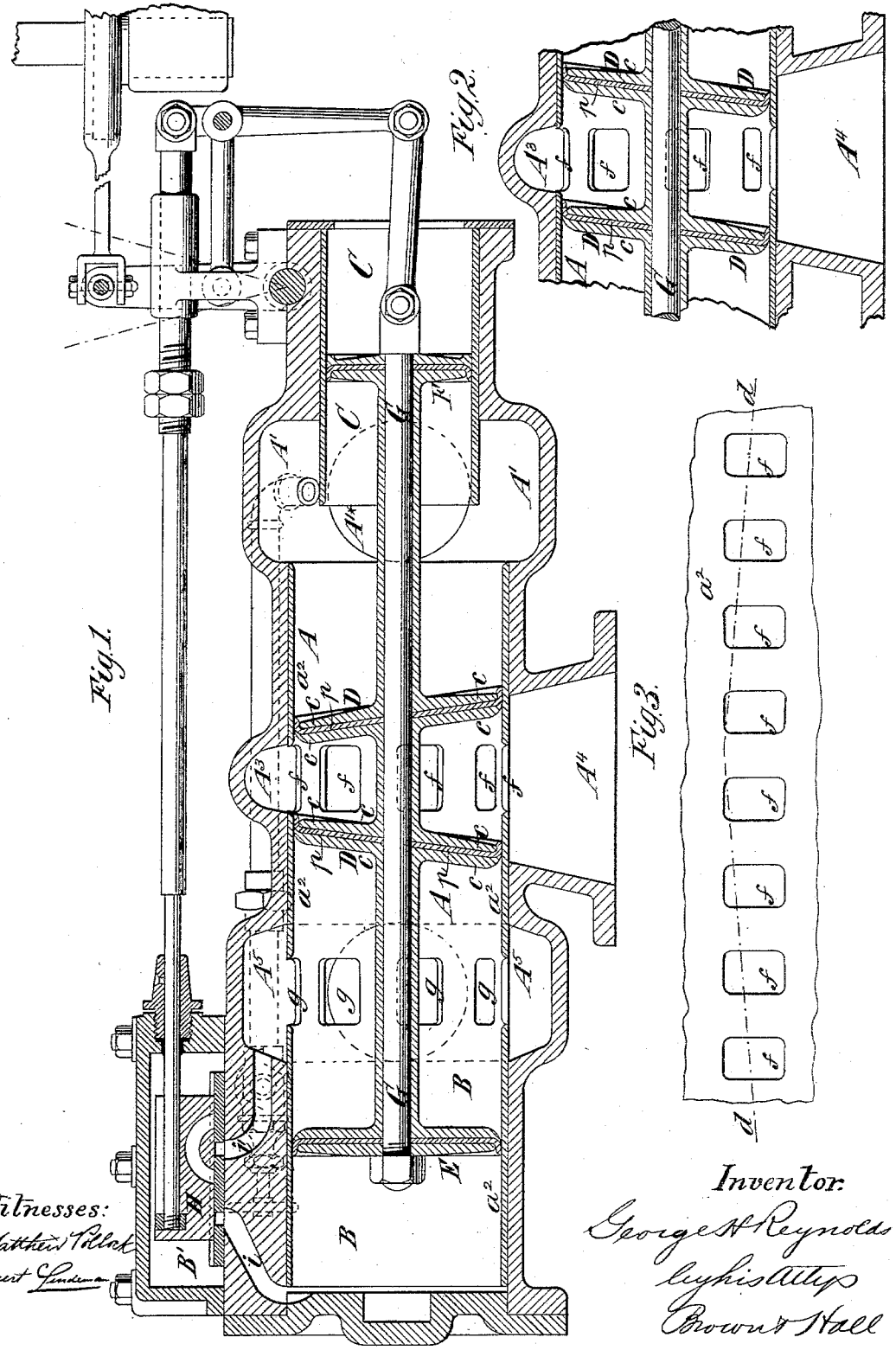
Witnesses:
Matthew Pollak
Nimert Linderman
Inventor:
George H. Reynolds
by his Attys
Brown & Hall

UNITED STATES PATENT OFFICE.

GEORGE H. REYNOLDS, OF NEW YORK, N. Y., ASSIGNOR OF ONE-HALF TO CRANE BROS. MANUFACTURING COMPANY, OF CHICAGO, ILLINOIS.

VALVE FOR HYDRAULIC ELEVATORS.

SPECIFICATION forming part of Letters Patent No. 323,367, dated July 28, 1885.

Application filed June 26, 1885. (No model.)

*To all whom it may concern:*

Be it known that I, GEORGE H. REYNOLDS, of the city and county of New York, in the State of New York, have invented a new and useful Improvement in Valves for Hydraulic Elevators, of which the following is a specification.

My invention relates to valves whereby the flow of liquid to and from the operating cylinders of hydraulic elevators is controlled, and which comprise a cylinder communicating by a circumferential series of slots or openings extending lengthwise of the cylinder, with a belt or jacket which is itself in uninterrupted communication with the operating-cylinder of the elevator, and a piston movable lengthwise of the cylinder to place said slots or openings in communication with the supply of liquid under pressure or with the discharge of liquid to the atmosphere. Where such slots or openings are of equal length throughout the circumference of the cylinder and the piston-heads or packings are directly transverse to the axis of the cylinder, the piston will act to open or close the slots or openings simultaneously.

The object of my invention is to provide for opening or closing the slots or openings in the cylinder in succession, or one after another, in order to avoid such shocks as are caused by the opening or closing of all the slots or openings simultaneously.

The invention consists in the combination, with a valve-cylinder having a surrounding belt or jacket, with which it communicates by a circumferential series of slots or openings, of a piston-valve working in the cylinder, and having its packings or surfaces, which operate to open and close the slots or openings, arranged obliquely to the axis of the valve, whereby, when the valve is moved, the slots or openings will be opened and closed in succession, or one after another. This piston-valve may consist of a single piston-head provided with one or more packings; or it may consist of two piston-heads placed at a sufficient distance apart to straddle the slots or openings.

In the accompanying drawings Figure 1 represents a longitudinal section of a hydraulic valve embodying my invention and mechanism for operating the same. Fig. 2 represents a similar section of a portion of a valve-cylinder and a valve of slightly modified form, also embodying the invention; and Fig. 3 is a diagram illustrating a development of the interior surface of the slotted cylinder, or representing such surface as it would appear in a flat plane, and showing by a dotted line the edge of the valve in its relation to these slots or openings.

Similar letters of reference designate corresponding parts in all the figures.

The valve which I have chosen to illustrate my invention, except in so far as it embodies my invention, is similar to that shown in my United States Letters Patent No. 314,720, dated March 31, 1885, and the mechanism which I have represented for operating the valve is similar to that shown in said patent.

A designates the valve-cylinder, at one end of which is a belt or space, A', into which leads the inlet $A'^*$ for liquid under pressure from any suitable source of supply, and at the other end of which is a belt or jacket, $A^5$, communicating with the atmosphere or with an exhaust-tank. At about the middle of the length of the cylinder A it is surrounded by a belt or jacket, $A^3$, having a nozzle or opening, $A^4$, which is to be placed in uninterrupted communication with the operating-cylinder of a hydraulic elevator.

On the supply side of the cylinder A, I have represented a smaller controlling-cylinder, C, and on the other or opposite side of the cylinder A, I have represented a larger controlling-cylinder, B. As here represented, a single lining, $a^2$, of brass or other material, is fitted to the cylinders A B, and the cylinder A communicates with the belt or jacket $A^3$ by a circumferential series of slots or elongated openings, $f$. In the lining opposite the discharge or outlet belt $A^5$ is a circular series of slots or openings, $g$.

D designates the piston-valve, which, as here represented, consists of two heads set at a sufficient distance apart to straddle or cover the slots or openings $f$, and each provided with a packing, $p$. To the larger controlling-cylinder, B, is fitted a piston, E, and to the smaller controlling-cylinder, C, is fitted a piston, F. The two pistons E F and the main valve D are all connected together by a common rod, G, so as to move simultaneously, and the movement of the valve and pistons in one direction or the other is controlled by a pilot or auxiliary valve, H, arranged within the chest B′, which communicates by passages or ports $i\ i'$ with the cylinder B on the outer side of its piston E, and with the exhaust or discharge belt $A^5$.

The connections through which the auxiliary or outlet valve H is controlled by the attendant in the elevator-car are fully described in my patent above referred to, and no explanation of them is here necessary, and the connections through which the auxiliary or pilot valve is moved automatically by the movement of the pistons E F and the main valve D are also fully described in my aforesaid patent, and are not included in my present invention. It is sufficient here to remark that by the movement of the main valve D to the left from the position shown in Fig. 1 the supply space or belt A′ will by the openings $f$ be placed in direct communication with the belt $A^3$ and with the operating-cylinder of the elevator, and by the movement of said valve to the right from the position shown in Fig. 1 the operating-cylinder of the elevator will, through the belt $A^3$, openings $f$, and openings $g$, be placed in direct communication with the exhaust or discharge belt $A^5$.

It will be seen that the piston-heads are composed of disks or plates $c$, between which are interposed packings $p$, and, as is clearly shown in the drawings, these disks or plates $c$ and their interposed packings are set obliquely to the axis of the piston; hence it will be seen that when the piston is moved in one direction or the other to open or close the slots $f$ the said slots will not all be opened or closed simultaneously, as would be the case were the packings $p$ arranged in planes directly transverse to the valve, but they will open in succession or one after another. For example, in moving the valve toward the left from the position shown in Fig. 1, those slots or openings $f$ which are at the top of the cylinder A will be first opened to the water-supply, and said slots will be opened in succession from the top to the bottom, those slots at the bottom being last opened. In this way not only is the letting on and shutting off of water from the operating-cylinder effected very gradually, but certain of the slots are closed entirely, while others remain open for a longer period, and hence as each slot is closed the current which had passed through it is diverted and caused to find its way through some of the other slots which still remain open. This will be best understood from Fig. 3, in which I have shown the slots or openings $f$ as they would appear in a flat plane, and have represented by a dotted line, $d$, the position which the packing $p$ of the piston-valve occupies relatively to these slots.

In lieu of making the packings of both piston-heads oblique in opposite directions to the axis of the cylinder, as shown in Fig. 1, they may be set in parallel planes, or oblique to the axis in the same direction, as shown in Fig. 2, or a single piston-head provided with one or two packings set obliquely to the axis might be substituted for the two piston-heads here shown.

My invention is applicable not only to hydraulic valves in which the valve is operated by the pressure of the motive fluid acting upon controlling-pistons, as illustrated in the drawings, but is also applicable to hydraulic valves, which are operated directly by hand-gear from the elevator car or cage.

What I claim as my invention, and desire to secure by Letters Patent, is—

In a hydraulic valve, the combination of a cylinder having a circumferential series of slots or openings, and a piston-valve movable in said cylinder to open or close said slots or openings, and having its packings in planes which are oblique to the axis of the valve and cylinder, substantially as and for the purpose herein described.

GEO. H. REYNOLDS.

Witnesses:
L. B. MASON,
GEO. G. WELLS.